Figure 1:
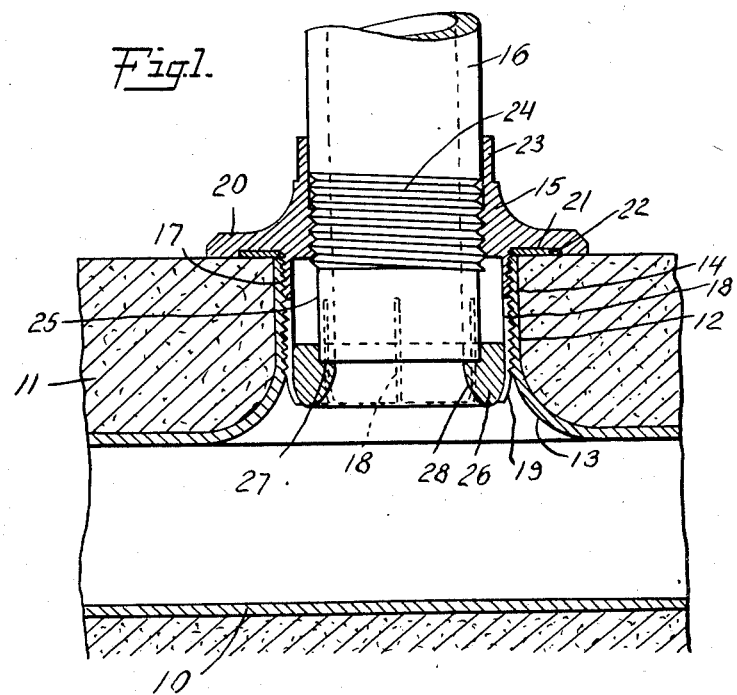

Oct. 16, 1934.  H. S. WALKER  1,976,817

OUTLET FITTING

Filed March 18, 1932

INVENTOR
Hervey S. Walker
BY
ATTORNEYS

Patented Oct. 16, 1934

1,976,817

UNITED STATES PATENT OFFICE 1,976,817

OUTLET FITTING

Hervey S. Walker, Ardmore, Pa.

Application March 18, 1932, Serial No. 599,692

4 Claims. (Cl. 247—28)

This invention relates to underfloor duct systems of the type now commonly installed in office and other similar buildings and is concerned more particularly with a novel standpipe assembly and mounting to be used in such systems for the protection of the electrical wiring led from the ducts to devices which require power.

At the present time, modern office buildings are customarily provided with systems of duct for electrical wiring installed in the floors while the buildings are in the course of construction, and one system of this type which has been widely used is illustrated and described in my Patent No. 1,592,548, issued July 13, 1926. The patented system includes runs of duct concealed below the floor surface, and having outlets at uniformly spaced intervals along their length, these outlets being formed by outlet fittings extending from the top of the ducts toward the floor surface. When not in use the fittings are closed by plugs or caps having portions visible in the floor surface, and whenever a connection is to be made to the wiring in the ducts, as, for example, for a lamp or telephone, the cap of the outlet fitting nearest the point where service is desired, is removed, and wires are fished through the outlet and duct to the nearest junction box where a connection is made to the supply lines. As the wiring leaving the outlet is normally led to an electrical device on or above the floor and usually at some distance from the outlet, it is customary to protect the wiring at the point of issuance from the outlet by means of a metal standpipe which extends above the floor a few inches and has a portion entering the outlet fitting, which thus serves as a mounting for the standpipe, and a floor flange which is turned down tight against the floor surface around the standpipe and helps to hold the standpipe in place. At its top, the standpipe is provided either with a receptacle, to the terminals of which the wires are connected, the receptacle receiving the prongs of a plug in the usual way, or else with a bushing through which the wires are led. Since the standpipe constitutes a continuation of the outlet fitting and terminates above the floor, it both raises the wiring so that it will not be walked on and prevents the entrance of water into the duct through the fitting.

The standpipes heretofore used have the disadvantage that they are not locked or anchored rigidly in position but are held in place either by friction or by a few screw threads, so that they are frequently dislodged from their mountings with consequent injury to the structure and to the wiring. The dislodgment of a standpipe may be brought about by a variety of causes, as for example, the standpipe may be struck by a desk or other piece of furniture being moved about. Also, when the standpipe lies beneath a desk, it is natural for the user of the desk to rest his feet upon it, and in the course of time, that results in the standpipe working loose, particularly when the floor around the standpipe is uneven or wavy and the floor flange of the standpipe has only a limited bearing against the floor. In the latter case, the standpipe can usually be rocked in its mounting to a slight degree, and, when it is thus continually rocked by the user of the desk, it soon works loose. Even, under the best conditions, the vibration of the building may cause the standpipe to become loose, and these various causes acting alone or together result in the displacement of the former standpipes to an extent such as to cause considerable annoyance and expense.

The present invention is directed to the provision of a novel standpipe assembly and mounting for use in underfloor duct systems which differs from those heretofore employed in that locking means are provided by which the standpipe assembly is locked or anchored in position and is held so firmly in place that it cannot be knocked loose under ordinary conditions of use. The mounting employed serves as the outlet fitting from the duct and in one form of the invention, that part of the standpipe assembly which is received in the mounting has parts which interengage with parts of the mounting and are prevented from displacement therefrom by strong locking means. The interengaging parts of the standpipe assembly and mounting may take the form of screw threads, beads on one part and channels on the other, or other similar constructions, but in each case, a locking or anchoring device is provided which wedges or jams the interengaging parts together and thus locks the standpipe in place. In another form of the invention, used ordinarily with outlet fittings of relatively large diameter, the standpipe assembly includes a bushing interposed between the fitting and the standpipe, and the bushing and fitting have interengaging parts and the standpipe and bushing also have interengaging parts. In this construction also the two groups of parts are locked together by a special anchoring means which prevents their disengagement.

Figure 2:
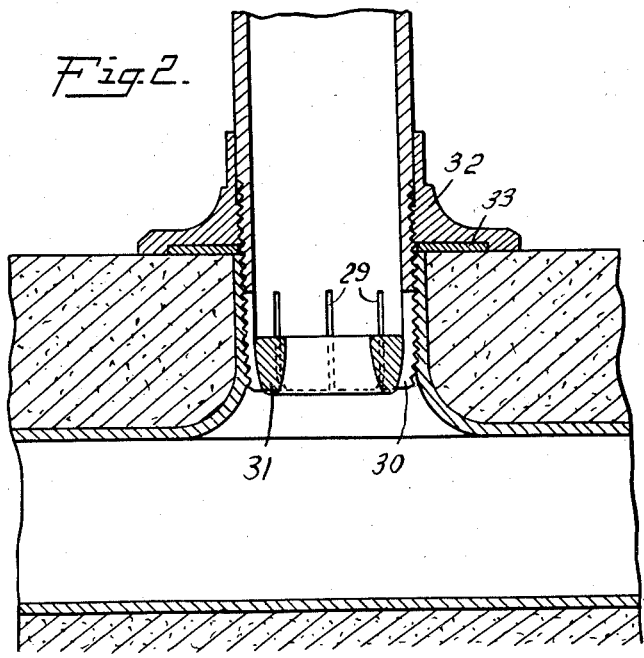

For a better understanding of the invention, reference may be had to the accompanying drawing in which Fig. 1 is a vertical sectional view of one form of the invention, and Fig. 2 is a vertical sectional view of another form.

In the drawing, the duct 10 which is of sheet metal is shown installed within floor material 11 and the duct is provided with a tubular outlet fitting 12 extending upward from the top of the duct toward the floor surface. In the construction illustrated, the outlet fitting terminates substanially flush with the floor surface but in some cases the fitting may terminate below the surface. The fitting may be attached to the duct in any desired manner and may, for example, be a tubular member mounted in an opening in the duct wall or secured to the duct by welding, or a neck extruded from the duct. Preferably the fitting has a rounded surface 13 adjacent its connection with the duct so that no injury will be done to the insulation or the wiring as the latter is fished through the outlet and duct. The fitting is formed on its inner surface with screw threads 14 and these threads extend substantially throughout the portion of the fitting which is of uniform diameter.

In the construction illustrated in Fig. 1, the outlet fitting is of relatively large diameter and the standpipe assembly includes a bushing 15 entering the fitting in which the end of standpipe 16 is received. The bushing has a portion 17 which is threaded externally and is screwed into the fitting and this portion of the bushing is slotted as indicated at 18 and the lower ends 19 of the tongues formed by the slots are bent inwardly toward the axis of the bushing. The bushing is provided with an integral flange 20 which rests upon the floor and in the under surface of the flange is a channel 21 in which is received a packing washer 22 of soft material, such as rubber. The upper end 23 of the bushing is of less diameter than its lower end and the upper end is provided with internal screw threads which receive threads 24 on the standpipe 16, the threads 24 being spaced back from the end of the standpipe and the standpipe having a portion 25 beyond the screw threads which is of less diameter than the remainder of the standpipe. The standpipe assembly and mounting are completed by a locking ring 26 which has an outer diameter not substantially less than the inner diameter of the lower end of the bushing and is provided with a circumferential seat 27 into which the lower end 25 of the standpipe is received.

In assembling the device, the bushing with the locking ring and packing washer in place is screwed into the outlet fitting until the flange is in tight engagement with the floor, the washer then lying close to the outer edge of the fitting and serving as packing which prevents water from flowing under the edge of the flange and into the fitting. The standpipe 16 is then screwed into the bushing and as it moves down into the bushing, its lower end is received in the seat in the locking ring and the ring is forced downward into enagement with the inturned ends of the tongues on the bushing. As the standpipe is forced further into the bushing, the locking ring forces the tongues outwardly and this causes the screw threads on the outer surface of the tongues to be wedged into the threads on the inner surface of the outlet fitting. Similarly, the resistance to the movement of the standpipe offered by the locking ring in engagement with the tongues causes the screw threads on the standpipe to be pressed against one side of the threads in the bushing, the action being similar to that of a lock nut. Accordingly when the installation is completed, the locking ring causes the interengaging parts of the bushing and fitting and the interengaging parts on the standpipe and bushing to be wedged tightly together. A double locking action is thus obtained and the standpipe assembly is so firmly anchored in place that it cannot be torn loose under ordinary conditions of use.

It will be observed that the locking ring has a flaring interior surface 28 so that wiring passing up from the duct and into the standpipe contacts with a smooth rounded surface of the ring. In ordinary use, the ring projects downwardly a slight distance below the bottom of the tongues on the bushing as shown, so that the wiring cannot contact with sharp edges but is drawn over rounded surfaces. This prevents injury to the insulation on the wiring during the making of connections.

The standpipe assembly illustrated in Fig. 1 is employed in connection with outlet fittings of substantially larger diameter than the outside diameter of the standpipe and the locking ring closes off the space between the outside of the standpipe and the inside of the bushing, thus making it possible to use a bushing, the lower end of which is of relatively thin material and sufficiently flexible to provide the desired locking connection.

The standpipe assembly illustrated in Fig. 2 is employed in installations in which the outlet fitting is of approximately the same diameter as the standpipe and, in this construction, the standpipe is threaded back from its lower end a substantial distance and the lower end is slotted as indicated at 29 with the tongues thus formed bent inwardly at their lower ends as indicated at 30. Within the standpipe is placed a locking ring 31 and its outer surface is threaded to receive a floor flange 32 provided with a recess in which a packing washer 33 is placed. In installing the construction shown in Fig. 2, the floor flange is threaded on the standpipe and backed away from the end a substantial distance. The standpipe is then screwed into the outlet fitting to the desired distance and the floor flange turned down tightly against the floor. The forcing of the flange into contact with the floor tends to pull the standpipe out of the fitting and thus causes the screw threads of the standpipe to be wedged in the screw threads on the outlet fitting. After the standpipe is threaded into the fitting, a suitable tool is inserted in the upper end of the standpipe and the locking ring is forced downward against the inturned ends of the tongues. This causes the ends of the tongues to be forced outwardly resulting in a further wedging of the threads on the standpipe into the threads on the fitting. The standpipe assembly is thus locked firmly in place and the danger of accidental dislodgement is greatly reduced.

While I have illustrated the fitting, the standpipe, and the bushing as having interengaging parts in the form of cut threads, it will be apparent that parts of other forms may be used as, for example, the parts which are to be interlocked may be provided with rolled threads or beads and channels. In all cases, the locking ring effects a wedging action which forces the parts into rigid engagement and the standpipe assembly is thus anchored in position and held much more rigidly than is possible with the constructions now used.

What I claim is:

1. In an underfloor duct system, the combination of a duct within the floor, an outlet extending from the top of the duct toward the floor surface, a standpipe assembly having a portion externally threaded, said portion being screwed into said outlet which is internally threaded, and means for producing a relative movement of said interengaging threads to force them into tight engagement, said means including an element within said assembly and lying within said outlet when said assembly is in place therein, said element being movable to a position in which it produces the relative movement of said threads.

2. In an underfloor duct system, the combination of a duct within the floor, an outlet extending from the top of the duct toward the floor surface, said outlet being internally threaded, a standpipe assembly having an expansible portion externally threaded, said portion being screwed into said outlet, and means for producing a relative movement of said interengaging threads to force them into tight engagement by expanding said portion, said means including an element lying within said expansible portion and movable to effect expansion thereof.

3. In an underfloor duct system, the combination of a duct within the floor, an outlet extending from the top of the duct toward the floor surface, and a standpipe assembly removable at the floor surface and comprising a bushing having a portion entering the outlet, said bushing and outlet having intermeshing parts, a standpipe entering the bushing, and means lying within said bushing and actuated by insertion of the standpipe into said bushing to produce a relative movement of said parts effective to force them into tight intermeshed engagement, said means including a removable member.

4. In an underfloor duct system, the combination of a duct with the floor, an outlet extending from the duct toward the floor surface, a standpipe assembly having a portion threaded into threads in said outlet, said portion of the assembly being expansible, and an element lying within said portion of the assembly, said element being operable to cause said portion to expand to lock said portion to said outlet.

HERVEY S. WALKER.